US010291572B2

(12) United States Patent
Bank et al.

(10) Patent No.: US 10,291,572 B2
(45) Date of Patent: May 14, 2019

(54) SELECTIVELY DELAYING SOCIAL MEDIA MESSAGES

(71) Applicant: International Business Machines Corporation, Armonk, NY (US)

(72) Inventors: Judith H. Bank, Cary, NC (US); Lisa M. Bradley, Cary, NC (US); Aaron J. Quirk, Austin, TX (US); Lin Sun, Morrisville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 142 days.

(21) Appl. No.: 14/557,824

(22) Filed: Dec. 2, 2014

(65) Prior Publication Data

US 2016/0156583 A1 Jun. 2, 2016

(51) Int. Cl.
*H04L 12/58* (2006.01)
*H04L 29/06* (2006.01)
*G06Q 10/06* (2012.01)
*G06Q 50/00* (2012.01)
G06Q 30/02 (2012.01)

(52) U.S. Cl.
CPC .............. *H04L 51/32* (2013.01); *G06Q 30/02* (2013.01); *G06Q 50/01* (2013.01); *H04L 51/14* (2013.01)

(58) Field of Classification Search
CPC ...... G06Q 50/01; G06Q 30/02; G06Q 10/109; G06Q 30/0264; G06Q 30/0269; H04L 51/32
See application file for complete search history.

(56) References Cited

U.S. PATENT DOCUMENTS

| 9,374,374 | B2* | 6/2016 | Steinberg ................ H04L 63/10 |
| 2005/0055379 | A1 | 3/2005 | Yamazaki et al. |
| 2010/0250643 | A1 | 9/2010 | Savage et al. |
| 2010/0318571 | A1 | 12/2010 | Pearlman et al. |

(Continued)

FOREIGN PATENT DOCUMENTS

| CN | 102185787 A | 9/2011 |
| CN | 102185826 A | 9/2011 |

OTHER PUBLICATIONS

Parra-Arnau et al; Smart Deferral of Messages for Privacy Protection in Online Social Networks, 1-22, Jan. 22, 2014.

(Continued)

*Primary Examiner* — Nicholas R Taylor
*Assistant Examiner* — Ho T Shiu
(74) *Attorney, Agent, or Firm* — Garg Law Firm, PLLC; Christopher K. McLane

(57) ABSTRACT

A method, system, and computer program product for selectively delaying social media messages in a social media environment are provided in the illustrative embodiments. A subject matter of a social media message is determined by analyzing the social media message at a first time after sending by a sender user and prior to publishing on a social media page of a receiver user. Using a delay rule related to the subject matter, a determination is made whether the publishing of the social media message on the social media page of receiver user should be delayed. Responsive to the delay rule concluding to delay the publishing, the publishing of the social media message on the social media page of the receiver user is delayed by a delay period.

16 Claims, 5 Drawing Sheets

(56) References Cited

U.S. PATENT DOCUMENTS

| | | | |
|---|---|---|---|
| 2011/0030067 A1 | 2/2011 | Wilson | |
| 2011/0113084 A1 | 5/2011 | Ramnani | |
| 2012/0102124 A1 | 4/2012 | Hansson et al. | |
| 2012/0159649 A1 | 6/2012 | Roger et al. | |
| 2012/0303659 A1 | 11/2012 | Erhart et al. | |
| 2013/0006882 A1 | 1/2013 | Galliani | |
| 2013/0262188 A1* | 10/2013 | Leibner | G06Q 50/01 705/7.36 |
| 2013/0290716 A1 | 11/2013 | Gavrilov | |
| 2015/0170294 A1* | 6/2015 | Goyal | G06Q 30/0264 705/14.61 |
| 2015/0237464 A1* | 8/2015 | Shumaker | H04L 51/20 709/204 |
| 2015/0288645 A1* | 10/2015 | Gianattasio | H04H 20/22 709/206 |
| 2015/0382079 A1* | 12/2015 | Lister | H04N 21/8456 725/38 |

OTHER PUBLICATIONS

Brown, IBM announces Vantage for IBM Connections and IBM Same time, Planet Lotus, Sep. 5, 2011.
Gayle, Facebook now knows what you look like as it rolls out face recognition by stealth, Mail Online, Jun. 8, 2011.
Reputation.com; Reputation.com launches my reputation student to help graduates establish a positive online presence, Jun. 2011.
Appendix P.

* cited by examiner

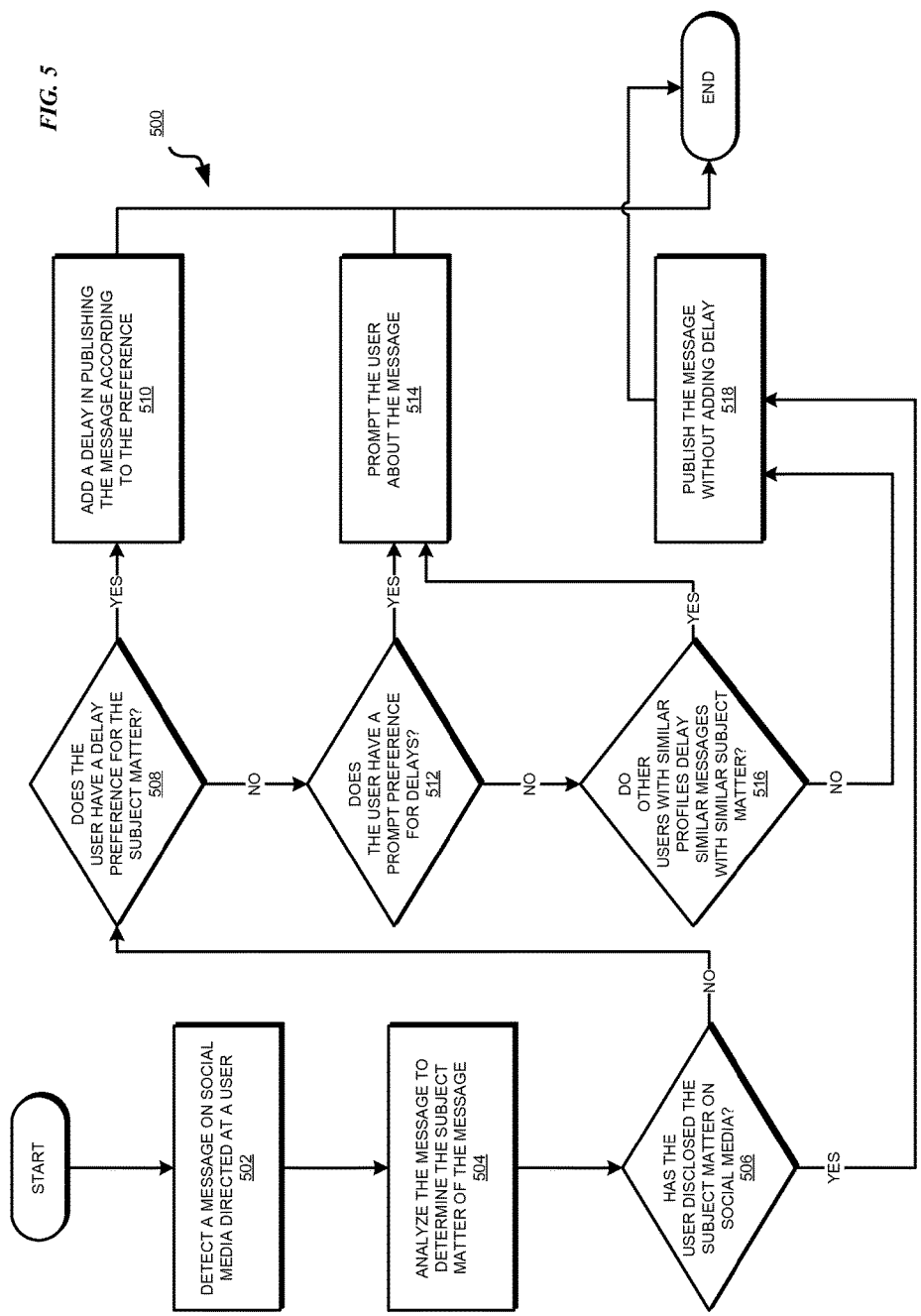

US 10,291,572 B2

SELECTIVELY DELAYING SOCIAL MEDIA MESSAGES

TECHNICAL FIELD

The present invention relates generally to a method, system, and computer program product for publishing messages on social media. More particularly, the present invention relates to a method, system, and computer program product for selectively delaying social media messages.

BACKGROUND

Social media comprises any medium, network, channel, or technology for facilitating communication between a large number of individuals and/or entities (users). Some common examples of social media are Facebook or Twitter, each of which facilitates communications in a variety of forms between large numbers of users (Facebook is a trademark of Facebook, Inc. in the United States and in other countries. Twitter is a trademark of Twitter Inc. in the United States and in other countries.) Social media, such as Facebook or Twitter allow users to interact with one another individually, in a group, according to common interests, casually or in response to an event or occurrence, and generally for any reason or no reason at all.

Some other examples of social media are websites or data sources associated with radio stations, news channels, magazines, publications, blogs, and sources or disseminators of news or information. Some more examples of social media are websites or repositories associated with specific industries, interest groups, action groups, committees, organizations, teams, or other associations of users.

Data from social media comprises unidirectional messages, or bi-directional or broadcast communications in a variety of languages and forms. Such communications in the social media data can include proprietary conversational styles, slangs or acronyms, urban phrases in a given context, formalized writing or publication, and other structured or unstructured data.

Structured data is data that conforms to an organization defined by a specification. In a data fragment of a structured data, the content of the data fragment has meaning or significance not only from the literal interpretation of the content of the fragment, but also from the form, location, and other organization-specific attributes of the fragment.

In contrast, unstructured data is data that does not conform to any particular organization. Furthermore, the position or form of the content in a data fragment of unstructured data generally does not contribute to the meaning or significance of the content.

Social media stores information about its users in a structured manner. For example, a user of a social media website has a profile, which includes a set of attributes. The profile attributes in a user profile capture a variety of information about the user, including but not limited to the user's name, location, address, marital status, nationality, age, gender, interests, likes, dislikes, preferences, and so on. Thus, the profile is structured data, comprising a data structure and including an organization of such information within that data structure.

A user's messages, contributions, or other similar interactions with the social media (collectively referred to hereinafter as "messages") can include any type or size of data. For example, a user can post text, pictures, videos, links, or combinations of these and other forms of information to a social media website. Furthermore, such information can be posted in any order, at any time, for any reason, and with or without any context. Thus, a user's interactions with a social media can be regarded as unstructured data.

SUMMARY

The illustrative embodiments provide a method, system, and computer program product for selectively delaying social media messages. An embodiment includes a method for selectively delaying social media messages in a social media environment. The embodiment determines, by analyzing a social media message at a first time after sending by a sender user and prior to publishing on a social media page of a receiver user, a subject matter of the social media message. The embodiment determines, using a delay rule related to the subject matter, whether the publishing of the social media message on the social media page of receiver user should be delayed. The embodiment delays, responsive to the delay rule concluding to delay the publishing, the publishing of the social media message on the social media page of the receiver user by a delay period.

Another embodiment includes a computer usable program product comprising a computer readable storage device including computer usable code for selectively delaying social media messages in a social media environment. Another embodiment includes a data processing system for selectively delaying social media messages in a social media environment.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 5 depicts a flowchart of an example process for selectively delaying social media messages in accordance with an illustrative embodiment.

DETAILED DESCRIPTION

Figure 1:
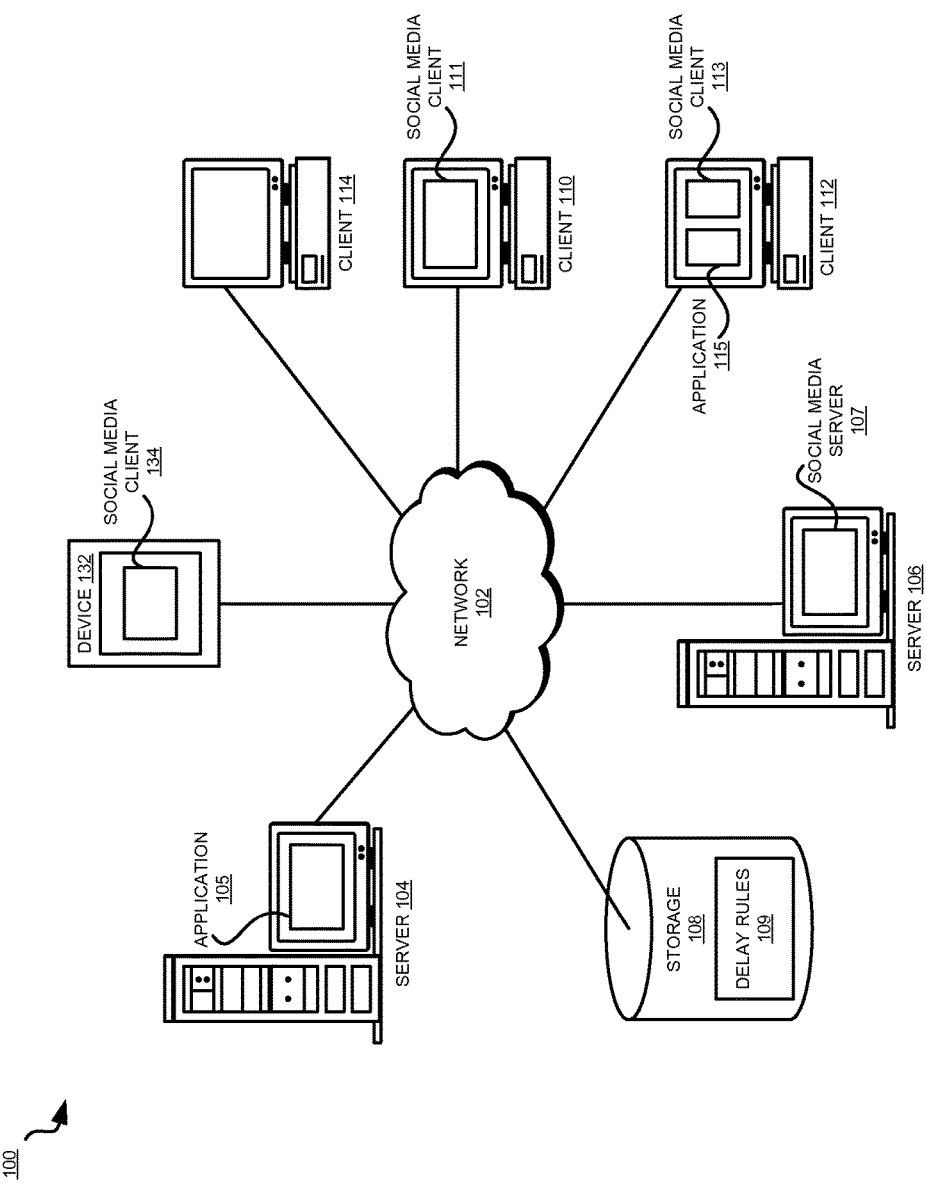
FIG. 1 depicts a block diagram of a network of data processing systems in which illustrative embodiments may be implemented.

Consider the following example scenario—one social media user (user 1) has a life event, such as the birth of a child. User 1 wants to announce the life event on social media at a time and in a manner of user 1's choosing. However, another social media user (user 2), such as a friend of user 1 knows about user 1's life event from other sources and posts a message on user 1's social media page congratulating user 1 on the life event. Even though user 1 was not ready to publicly announce the life event yet, user 2's congratulatory message effectively published user 1's news contrary to user 1's preference.

The illustrative embodiments recognize that such occurrences are common place on social media. Information about birth, job change, marriage, relocation, promotion, job loss, victories, and defeats often reach a social media user's acquaintances in ways other than the social media. Users are largely powerless in controlling the distribution or publication of such information by others.

Presently, some social media networks employ filters to keep certain content out of the social media. However, the illustrative embodiments recognize that those filters are primarily designed to filter out that content which the social media network deems unsuitable for distribution. Such filters are not within the control of individual social media users, and the users cannot configure these existing filters according to their particular needs.

Presently, social media networks allow a user to control their privacy settings. However, the illustrative embodiments recognize that these settings only control who can see the user's messages and publications, and what those viewers can do with such messages or publications. The illustrative embodiments recognize that the privacy settings of a user do not control what others can publicize about the user, or how or when others can publicize information concerning the user.

Presently, social media networks allow a user to control the publication of a message where the user is expressly mentioned, or "tagged". However, the illustrative embodiments recognize that such tagging only operates when the user is mentioned in the message a specific syntactic manner. The illustrative embodiments recognize that the tagging and tagging-related controls cannot operate on the subject matter of a message regardless of whether the receiver user is mentioned in the message. For example, if user 2's message states, "hey, congratulations on the new arrival!" the tagging-based controls will not operate because user 1 is not expressly named in the message according to a specified syntax. Also, even when the user 1 is specified in the message and user 1 can be tagged, user 2 is free to remove the tag and allow the message to escape user 1's tagging controls.

The illustrative embodiments used to describe the invention generally address and solve the above-described problems and other problems related to controlling the publication of information on social media. The illustrative embodiments provide a method, system, and computer program product for selectively delaying social media messages.

An embodiment operates in conjunction with a social media server to delay a social media message of one user according to a preference of another user. A user (user 1) can configure how or when a message from user 2 should be published if user 2's message contains information about user 1.

For example, assume that user 2 prepares and posts a message that includes some information related to user 1. When user 2 posts a message on user 1's social media page, user 1's social media group of acquaintances can see the message, user 2's social media group of acquaintances can see the message, users outside both groups can see the message, or some combination thereof.

In continuation of the above example of user 1's life event, assume that user 2 has prepared and transmitted for posting the congratulatory message on user 1's social media page (hereinafter referred to as "page" for compactness). A social media server receives the message from user 2. An embodiment operating with the social media server analyzes the message to determine whether the message contains information or relates to subject matter that user 1 has chosen to delay. If the analysis reveals that the subject matter of the message is related to a subject matter that user 1 has chosen to delay, the embodiment causes the social media server to delay publishing the message. The delay prevents one or more groups of social media acquaintances or users from accessing the message until the delay period has elapsed.

Another embodiment allows a social media user to configure which messages the user wants to delay. Specifically, the user can configure the embodiment to delay messages from specific users, messages containing certain phrases, messages pertaining to certain subject matter, messages referring to an event or entity, messages referring to a time or place, or some combination of these and many other aspects of a message from another user. From this disclosure, those of ordinary skill in the art will be able to conceive many other aspects of a social media message from a sender user based on which a receiver user can configure the embodiment to delay the publication of the message on the social media network. For example, a receiver user can also choose to delay a sender user's message if the sender user sends the message from a particular location.

Another embodiment allows a user to configure how to handle a message that satisfies a condition configured for delaying the message. For example, suppose that user 1 has configured a delay rule that if a message contains the subject matter of a birth event related to user 1, user 2's congratulatory message satisfies such a delay rule. A delay rule is any logic configured to detect a condition in a message, where, if the condition exists in the message, the message is selected for publication after a delay.

The embodiment allows a user to determine whether to publish the message without adding a delay, set a delay period, block the message from publishing, or release the message from being subject to the delay. For example, the embodiment causes a prompt to be presented to user 1 with one or more options for delaying the message. The prompting operation occurs by the operation of a server-side embodiment operating in conjunction with a client-side embodiment, where the server-side embodiment operates in conjunction with a social media server and the client-side embodiment operates in conjunction with a social media client used by user 1.

According to an input provided by user 1 in response to the prompt at embodiment operating with the social media client, the embodiment adds a corresponding delay to publishing the message. The delay can range from no-delay, i.e., publish without adding a delay, to permanent-delay, i.e., block from publishing.

For example, user 1 may want to delay the message if user 1 has not yet made the news of the birth public. Similarly, user 1 may want to release the message from being subject to the delay if user 1 has already made the birth announcement.

Another embodiment makes an automatic determination about whether to delay the message that satisfies a delay rule. For example, the embodiment, operating in conjunction with the social media server accesses the receiver user's social media profile, e.g., user 1's social media profile, in the social media network. As an example, if the user's privacy settings exceed a threshold privacy setting, the embodiment determines that the user is highly conscious about the user's privacy. Accordingly, the embodiment sets a delay period for the publication of the message. The embodiment prevents the message from being published on the receiver user's page until the delay period expires.

As another example, another embodiment allows a receiver user to configure specific subject matters for delayed publishing. If the embodiment determines that the subject matter of the message matches a configured subject matter within a threshold, the embodiment sets a delay period for the publication of the message.

As another example, another embodiment allows a receiver user to configure specific subject matters for delayed publishing. The embodiment accesses the receiver user's profile, messages published by the receiver user, or some combination thereof. The embodiment analyzes the receiver user's profile or publications to determine whether the user has already published a message or changed a status in the user's profile in a manner that indicates that the receiver user has disclosed the subject matter of the message presently being analyzed for delaying. If the embodiment determines that the receiver user has already disclosed the subject matter of the message, the embodiment does not set a delay period for the publication of the message. For example, if the embodiment determines that user 1 has already made the birth announcement on user 1's social media page, the embodiment does not prevent or delay user 2's congratulatory message from being published on user 1's page.

In certain circumstances, a user may not configure a delay rule specifically. Under such circumstances, an embodiment applies a default delay rule or selects a delay rule used by another user.

Consider, for example, that user 1 has forgotten to configure the birth life event subject matter for a delay rule. An embodiment compares user 1's profile settings and other published messages with the profile and/or messages of other social media users. The embodiment selects one or more other users whose preferences match the preferences of user 1 within a tolerance. The embodiment determines whether any of the similar users have a delay rule configured for a similar subject matter. If so, the embodiment determines that the delay rule should also be applied to the message to user 1. In one implementation, the embodiment automatically applies such a delay rule from another comparable user's preferences. In another implementation, the embodiment prompts user 1 to decide whether such a delay rule from another comparable user's preferences should be applied to the congratulatory message sent to user 1.

An embodiment can dynamically analyze the profile changes and message postings of a user. According to this dynamic analysis, the embodiment changes the user's delay preferences. For example, the embodiment may include or exclude certain subject matters from delay rules, change a selection of sender users whose messages should be delayed, change a selection of delay rules that should be used for handling messages directed to the user, or some combination of these and other conditions as will be apparent from this disclosure to those of ordinary skill in the art.

A method of an embodiment described herein, when implemented to execute on a device or data processing system, comprises substantial advancement of the functionality of that device or data processing system in managing social media messages. For example, the prior-art does not allow a receiver user to configure delays in publishing messages from other sender users in a social media network. In contrast, an embodiment allows a user to control how messages directed to the user are selected for delaying, and when they are allowed to be published on the user's social media page. Operating in a manner described herein, an embodiment allows a social media user to control the distribution of information related to the user. Such manner of managing social media messages is unavailable in presently available devices or data processing systems. Thus, a substantial advancement of such devices or data processing systems by executing a method of an embodiment increases the control a social media user can exert on messages pertaining to the user and originating from other social media users.

The illustrative embodiments are described with respect to certain social media operations, messages, delays, delay rules, conditions, configurations, profiles, analyses, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
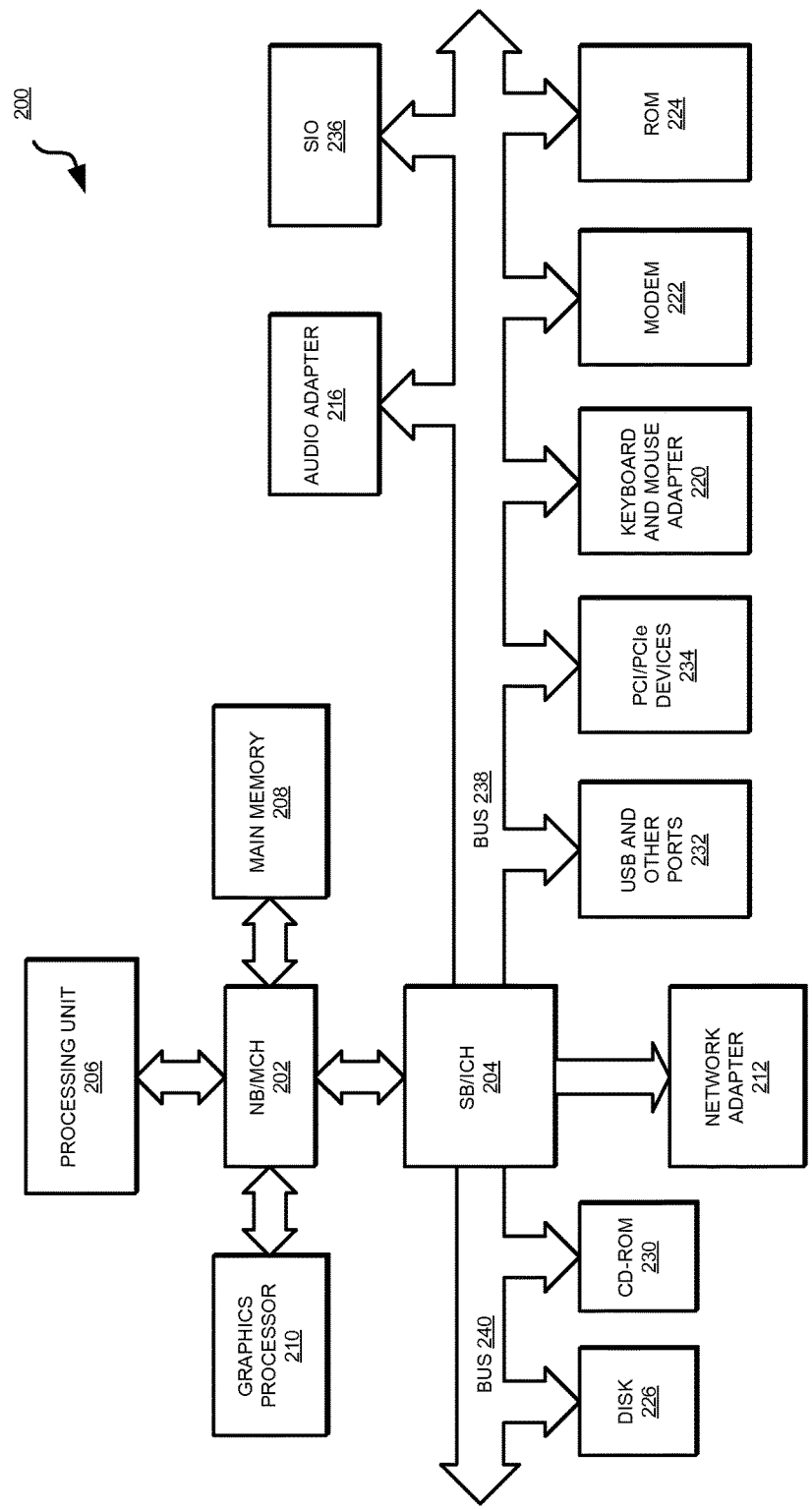
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a mobile device and is usable for executing an implementation of an embodiment, such as a version of social media client application 134 that is configured in a manner suitable for execution on device 132. For example, device 132 can take the form of a smartphone, a tablet computer, a laptop computer, client 110 in a stationary or a portable form, a wearable computing device, or any other similarly purposed device. Application 105 in server 104 implements a server-side embodiment described herein, which operates in conjunction with social media server 107 and uses delay rules 109. Social media clients 111 and 115 are other examples of social media client applications that social media users can use for communicating with social media server 107. Application 115 implements a client-side embodiment described herein, which operates in conjunction with social media client 113. Application 105 and application 115 collaborate to provide certain functionality in a manner described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as device 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 or application 115 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
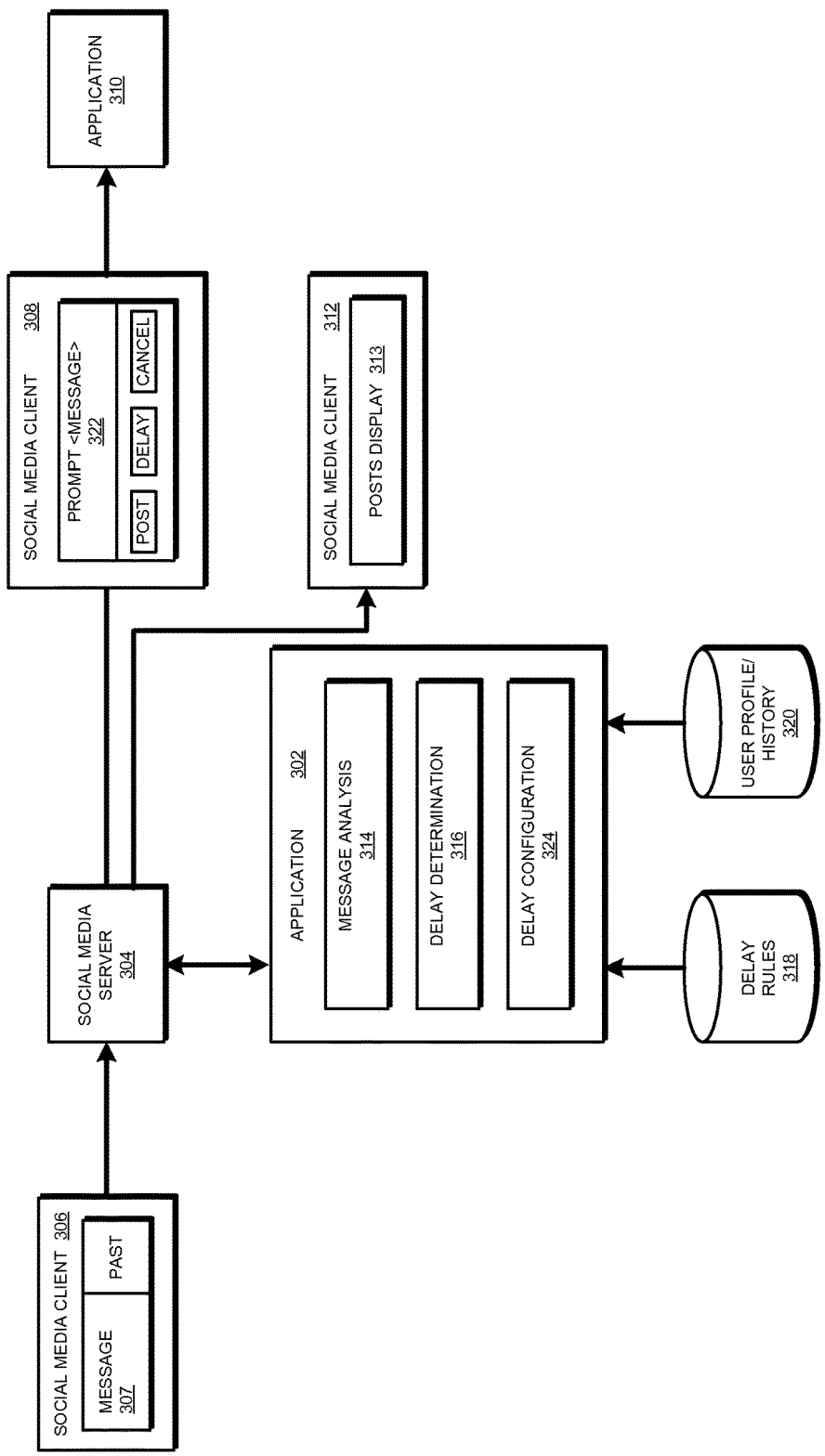
FIG. 3 depicts a block diagram of an example configuration for selectively delaying social media messages in accordance with an illustrative embodiment.

With reference to FIG. 3, this figure depicts a block diagram of an example configuration for selectively delaying social media messages in accordance with an illustrative embodiment. Application 302 is an example of application 105 in FIG. 1. Social media server 304 is an example of social media server 107 in FIG. 1.

Social medial client 306 is a client application used by a sender user to send social media message 307 for posting on a receiver user's social media page. In the depicted example, the receiver user uses social media client 308. Social media client 308 operates in conjunction with application 310. Application 310 is an example of application 115 in FIG. 1. If and when the message from the sender user is posted on the receiver user's page, another user is able to access the message using social media client 312, such as in the form of display 313 of posted messages.

When social media server 304 receives message 307 from social media client 306, component 314 of application 302 analyzes message 307 to identify a subject matter of message 307. For example, component 314 may use a Natural Language Processing (NLP) engine (not shown) to determine the subject matter of message 307. Component 314 can be configured to determine any aspect of message 307 as described elsewhere in this disclosure. For example, component 314 can determine the sender user's identity, location of sending, and other aspects associated with message 307.

Component 316 determines whether the subject matter or another aspect of message 307 warrants delaying the publication of message 307 on the social media page of the receiver user associated with social media client 308. For example, component 316 determines whether the subject matter or another aspect of message 307 matches, within a tolerance and according to a delay rule in delay rules 318, a subject matter or another corresponding aspect specified in the receiver user's profile in repository 320.

Optionally, component 316 collaborates with application 310 to present prompt 322 on social media client 308. For example, prompt 322 allows the receiver user a preview of message 307, and presents suitable controls for managing the publication of message 307 on the receiver user's page. An example control interface, such as the depicted "Post" control button allows the receiver user to avoid delaying the posting of message 307. Another example control interface, such as the depicted "Delay" control allows the receiver user to delay the posting of message 307 according to a preset delay period or to set a delay period for message 307. Another example control interface, such as the depicted "Cancel" control button allows the receiver user to avoid posting of message 307 all together.

These example manners of prompting, and the example controls are not intended to be limiting on the illustrative embodiments. From this disclosure, those of ordinary skill in the art will be able to conceive many other manners of prompting and many other controls that are usable for a similar purpose and the same are contemplated within the scope of the illustrative embodiments.

Furthermore, in one embodiment, component 316 operates to learn from the receiver user's inputs. For example, if the receiver user selects to delay a message pertaining to a subject matter by a certain period, component 316 learns that the receiver user prefers to delay messages pertaining to that subject matter by that period. Accordingly, when another message with the same subject matter is posted by another sender user, component 316 omits prompting the receiver user again, and automatically configures to delay the other message by the period selected before. Such learning and automatic application of the learned delays apply if other circumstances remain unchanged, e.g., if the receiver user has not publicized the subject matter himself or herself, or if the subject matter has not yet become known in other ways.

Furthermore, component 316 can update the amount of the learned delay. For example, if the receiver user selected to delay the first message by three hours and the second message pertaining to the same subject matter arrives one hour after the first message, component 316 applies only the remainder of the delay, to wit, two hours, to the second message. As another example, suppose that the receiver user selects to delay the first message by three hours, and before the second message arrives, the receiver user updates a delay configuration for the subject matter of the first message such that messages pertaining to that subject matter have to be delayed until a certain date and time. Accordingly, component 316 updates the delay applied to the first message, so that the first message is not published until that configured data and time, even if that date and time are after or prior to the originally set delay of three hours. Furthermore, component 316 omits prompting the user when a second message pertaining to the same subject matter arrives and delays the second message until the configured date and time, subject to other circumstances of publication of the subject matter remaining unchanged.

Figure 4:
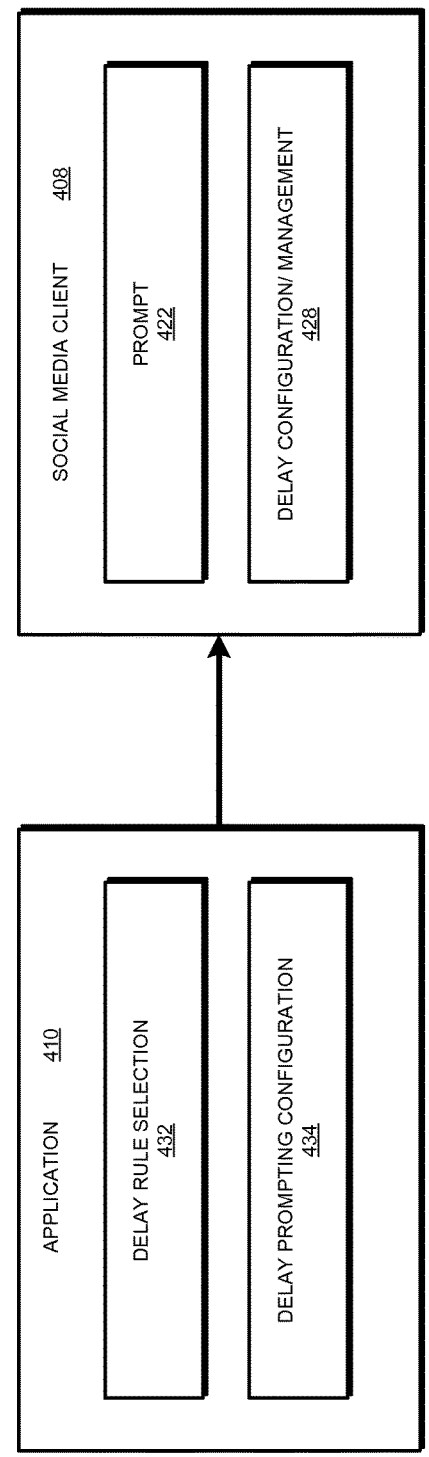
FIG. 4 depicts a block diagram of an example client-side configuration for selectively delaying social media messages in accordance with an illustrative embodiment.

Component 324 allows a receiver user to configure one or more message subject matter, message aspects, delay rules, profile setting for delaying the publication of received messages, or some combination thereof. For example, component 324 operates in conjunction with application 310 to include or exclude certain delay rules 318 in processing the delay of received messages for a receiver user. Similarly, component 324 operates in conjunction with application 310 to include or exclude certain message subject matter, message aspects, and other profile setting in repository 320 for delaying the publication of received messages, for the receiver user. FIG. 4 depicts some more example features of application 310 for similar purposes.

With reference to FIG. 4, this figure depicts a block diagram of an example client-side configuration for selectively delaying social media messages in accordance with an illustrative embodiment. Social media client 408 is an example of social media client 308 in FIG. 3. Application 410 is an example of application 310 in FIG. 3. Prompt 422 is an example of prompt 322 in FIG. 3.

Application 410 includes component 432, which receives a set of delay rules from application 302 in FIG. 3. In one embodiment, component 432 receives an identifier and a set of parameters that govern a delay rule in the set. In another embodiment component 432 receives a configurable logic of a delay rule in the set.

Component 432 presents console 428 in social media client 408. Console 428 allows the user to select or deselect certain delay rules, configure a delay rule, or a combination thereof.

Component 434 presents prompt 322 in collaboration with application 302 in FIG. 3, as described earlier. For example, component 434 presents one or more messages that have been selected for delaying at application 302, and which require the receiver user's input for delayed publication determination.

With reference to FIG. 5, this figure depicts a flowchart of an example process for selectively delaying social media messages in accordance with an illustrative embodiment. Process 500 can be implemented in application 302 in FIG. 3.

The application detects a message on a social media, the message being directed from a sender user at a receiver user (block 502). The application analyzes the message to determine the subject matter of the message (block 504).

The application determines whether the user has disclosed the subject matter on the social media (block 506). If the user has disclosed the subject matter on the social media ("Yes" path of block 506), the application proceeds to block 518 where the application publishes the message without adding any delay to the publishing and ends process 500 thereafter. If the user has not disclosed the subject matter on the social media ("No" path of block 506), the application determines whether the user has a delay preference configured for the subject matter (block 508).

If the user has a delay preference configured for the subject matter ("Yes" path of block 508), the application adds a delay in publishing the message according to the preference (block 510). The application ends process 500 thereafter.

If the user does not have a delay preference configured for the subject matter ("No" path of block 508), the application determines whether the user has a preference for prompting about delaying the publication of messages (block 512). If the user has a preference for prompting about delaying the publication of messages ("Yes" path of block 512), the application prompts the user with suitable controls for managing the publication delay of the message (block 514). The application ends process 500 thereafter.

If the user does not have a preference for prompting about delaying the publication of messages ("No" path of block 512), the application determines whether other users with similar profiles have chosen to delay similar messages with similar subject matter (block 516). If other users with similar profiles have chosen to delay similar messages with similar subject matter ("Yes" path of block 516), the application proceeds to block 514 and prompts the user for delaying the publication according to a delay rule configured by one or more such other users. If other users with similar profiles have not chosen to delay similar messages with similar subject matter ("No" path of block 516), the application publishes the message without adding any delay (block 518). The application ends process 500 thereafter.

Various decisions, such as in blocks 506, 506, 512, and 516 are depicted only as examples. Other decisions can be included in process 500 in a similar manner depending upon the implementation, and the same are contemplated within the scope of the illustrative embodiments. Furthermore, not all decisions depicted in FIG. 5 are necessary to operate an embodiment. An implementation can add, remove, or modify one or more decision blocks or other operations in process 500 without departing the scope of the illustrative embodiments.

Thus, a computer implemented method, system or apparatus, and computer program product are provided in the illustrative embodiments for selectively delaying social media messages. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for selectively delaying social media messages in a social media environment, the method comprising:

determining, by analyzing a social media message using a natural language processing engine at a first time after sending by a sender user and prior to publishing on a social media page of a receiver user, a subject matter of the social media message, the receiver user being different than the sender user, and the social media message including subject matter prepared by the sender user relating to a life event associated with the receiver user;

determining whether the receiver user has published a second social media message containing the subject matter within a threshold value prior to the first time;

determining, responsive to the receiver user not having published the second social media message containing the subject matter within the threshold value prior to the first time, whether the receiver user has a delay preference set in a profile of the receiver user for the subject matter;

determining, responsive to determining that the receiver user has a delay preference set in the profile of the receiver user for the subject matter, by a processor using a delay rule related to the subject matter configured by the receiver user based upon the delay preference, whether the publishing of the social media message on the social media page of receiver user should be delayed, the receiver user configuring the delay rule to apply to the determined subject matter; and delaying, responsive to the delay rule concluding to delay the publishing, the publishing of the social media message on the social media page of the receiver user by a delay period.

2. The method of claim 1, further comprising:

determining, by analyzing a second social media message at a second time after sending by the sender user and prior to publishing on the social media page of the receiver user, a second subject matter of the second social media message;

determining that the receiver user has published a third social media message on the social media page of the receiver user prior to the second time, the third message containing the second subject matter; and publishing the second social media message on the social media page of the receiver user without adding the delay period to the publishing of the second social media message.

3. The method of claim 1, further comprising:

prompting the receiver user with a prompt, the prompt comprising the subject matter;

receiving, responsive to the prompting, an input from the receiver user; and selecting the delay rule according to the input.

4. The method of claim 3, further comprising:

modifying the delay rule, wherein the modifying changes a second delay period configured in the delay rule to the delay period.

5. The method of claim 1, further comprising:

locating a different user in the social media environment, wherein the different user and the receiver user have at least one parameter common between a profile of the different user and a profile of the receiver user;

determining that the different user has selected the delay rule for a second subject matter; and selecting the delay rule for delaying the publishing of the social media message on the social media page of the receiver user.

6. The method of claim 5, wherein the second subject matter has at least one characteristic in common with the subject matter.

7. The method of claim 5, further comprising:

prompting the receiver user with a prompt, the prompt comprising an identifier associated with the delay rule;

receiving, responsive to the prompting, an input from the receiver user; and selecting the delay rule according to the input.

8. The method of claim 1, wherein the subject matter is distinct from an identity of the receiver user.

9. A computer usable program product comprising a computer readable storage device including computer usable code for selectively delaying social media messages in a social media environment, the computer usable code comprising:

computer usable code for determining, by analyzing a social media message using a natural language processing engine at a first time after sending by a sender user and prior to publishing on a social media page of a receiver user, a subject matter of the social media message, the receiver user being different than the sender user;

computer usable code for determining whether the receiver user has published a second social media message containing the subject matter within a threshold value prior to the first time;

computer usable code for determining, responsive to the receiver user not having published the second social media message containing the subject matter within the threshold value prior to the first time, whether the receiver user has a delay preference set in a profile of the receiver user for the subject matter;

computer usable code for determining, responsive to determining that the receiver user has a delay preference set in the profile of the receiver user for the subject matter, using a delay rule related to the subject matter configured by the receiver user based upon the delay preference, whether the publishing of the social media message on the social media page of receiver user should be delayed, the receiver user configuring the delay rule to apply to the determined subject matter; and computer usable code for delaying, responsive to the delay rule concluding to delay the publishing, the publishing of the social media message on the social media page of the receiver user by a delay period.

10. The computer usable program product of claim 9, further comprising:

computer usable code for determining, by analyzing a second social media message at a second time after sending by the sender user and prior to publishing on the social media page of the receiver user, a second subject matter of the second social media message;

computer usable code for determining that the receiver user has published a third social media message on the social media page of the receiver user prior to the second time, the third message containing the second subject matter; and computer usable code for publishing the second social media message on the social media page of the receiver user without adding the delay period to the publishing of the second social media message.

11. The computer usable program product of claim 9, further comprising:
computer usable code for prompting the receiver user with a prompt, the prompt comprising the subject matter;
computer usable code for receiving, responsive to the prompting, an input from the receiver user; and
computer usable code for selecting the delay rule according to the input.

12. The computer usable program product of claim 11, further comprising:
computer usable code for modifying the delay rule, wherein the modifying changes a second delay period configured in the delay rule to the delay period.

13. The computer usable program product of claim 9, further comprising:
computer usable code for locating a different user in the social media environment, wherein the different user and the receiver user have at least one parameter common between a profile of the different user and a profile of the receiver user;
computer usable code for determining that the different user has selected the delay rule for a second subject matter; and
computer usable code for selecting the delay rule for delaying the publishing of the social media message on the social media page of the receiver user.

14. The computer usable program product of claim 9, wherein the computer usable code is stored in a computer readable storage device in a data processing system, and wherein the computer usable code is transferred over a network from a remote data processing system.

15. The computer usable program product of claim 9, wherein the computer usable code is stored in a computer readable storage device in a server data processing system, and wherein the computer usable code is downloaded over a network to a remote data processing system for use in a computer readable storage device associated with the remote data processing system.

16. A data processing system for selectively delaying social media messages in a social media environment, the data processing system comprising:
a storage device, wherein the storage device stores computer usable program code; and
a processor, wherein the processor executes the computer usable program code, and wherein the computer usable program code comprises:
computer usable code for determining, by analyzing a social media message using a natural language processing engine at a first time after sending by a sender user and prior to publishing on a social media page of a receiver user, a subject matter of the social media message, the receiver user being different than the sender user;
computer usable code for determining whether the receiver user has published a second social media message containing the subject matter within a threshold value prior to the first time;
computer usable code for determining, responsive to the receiver user not having published the second social media message containing the subject matter within the threshold value prior to the first time, whether the receiver user has a delay preference set in a profile of the receiver user for the subject matter;
computer usable code for determining, responsive to determining that the receiver user has a delay preference set in the profile of the receiver user for the subject matter, using a delay rule related to the subject matter configured by the receiver user based upon the delay preference, whether the publishing of the social media message on the social media page of receiver user should be delayed, the receiver user configuring the delay rule to apply to the determined subject matter; and
computer usable code for delaying, responsive to the delay rule concluding to delay the publishing, the publishing of the social media message on the social media page of the receiver user by a delay period.

* * * * *